US 9,250,382 B2

(12) United States Patent
Ayoub et al.

(10) Patent No.: US 9,250,382 B2
(45) Date of Patent: Feb. 2, 2016

(54) LED ILLUMINATED GLASS INSULATING PANEL

(75) Inventors: Patrick Ayoub, Jumet (BE); Carmelo Dado, Jumet (BE)

(73) Assignee: AGC GLASS EUROPE, Louvain-La-Neuve (BE)

( * ) Notice: Subject to any disclaimer, the term of this patent is extended or adjusted under 35 U.S.C. 154(b) by 0 days.

(21) Appl. No.: 14/400,137

(22) PCT Filed: May 23, 2012

(86) PCT No.: PCT/EP2012/059612
§ 371 (c)(1),
(2), (4) Date: Nov. 10, 2014

(87) PCT Pub. No.: WO2013/174427
PCT Pub. Date: Nov. 28, 2013

(65) Prior Publication Data
US 2015/0103557 A1    Apr. 16, 2015

(51) Int. Cl.
*F21V 7/04*    (2006.01)
*F21V 8/00*    (2006.01)
*F21Y 101/02*  (2006.01)

(52) U.S. Cl.
CPC ............ *G02B 6/0091* (2013.01); *G02B 6/0065* (2013.01); *G02B 6/0085* (2013.01); *G02B 6/0093* (2013.01); *F21Y 2101/02* (2013.01)

(58) Field of Classification Search
CPC .... F21Y 2101/02; G02B 6/00; G02B 6/0065; G02B 6/006; G02B 6/0011; G02B 6/0081; G02B 6/0085
USPC .................................. 362/611, 613, 615, 632
See application file for complete search history.

(56) References Cited

U.S. PATENT DOCUMENTS 8,297,823 B2 * 10/2012 Cho ..................... G02B 6/0068
                                                           349/58
9,028,932 B2 *  5/2015 Van Dijk ................. C03C 27/06
                                                           174/255

(Continued)

FOREIGN PATENT DOCUMENTS

EP        2 450 626       5/2012
WO     2010 097110       9/2010

OTHER PUBLICATIONS

Written Opinion of the International Searching Authority issued Feb. 15, 2013 in PCT/EP12/059612 Filed May 23, 2012.

(Continued)

*Primary Examiner* — Ali Alavi
(74) *Attorney, Agent, or Firm* — Oblon, McClelland, Maier & Neustadt, L.L.P.

(57) ABSTRACT

A glass lighting panel (1), comprising: a first glass substrate (101), a second glass substrate (102), a spacer profile (103) at the periphery of the glass panel (1) between the first and the second glass substrate, the spacer being used to maintain an intermediate space (104) between the first and second glass substrates, According to the invention, the panel comprises: an intermediate organic glass substrate (105), at least one light source (106). According to the invention, the spacer profile (103) comprises: means (107) to maintain the intermediate organic glass substrate (105) in the intermediate space (104) between the first and the second glass substrates, means (108) to lodge the at least one light source (106) so as the at least one light source emits light into the intermediate organic glass substrate (105) predominantly along a plane of the panel. According to the invention, at least part of the intermediate organic glass substrate (105) is arranged to deflect the light out of the plane of the panel and through at least one of the first and second glass substrates to provide a diffused light output.

16 Claims, 2 Drawing Sheets

(56) References Cited

U.S. PATENT DOCUMENTS

| | | | |
|---|---|---|---|
| 2006/0187681 A1 | 8/2006 | Hsiao et al. | |
| 2007/0091645 A1* | 4/2007 | Chang | G02B 6/0088 362/632 |
| 2012/0092890 A1* | 4/2012 | Matsui | G02B 6/0091 362/607 |

OTHER PUBLICATIONS

International Search Report issued Feb. 15, 2013 in PCT/EP12/059612 Filed May 23, 2012.

* cited by examiner

LED ILLUMINATED GLASS INSULATING PANEL

FIELD OF THE INVENTION

This invention relates to glass lighting panels, and to methods of manufacturing the same.

DESCRIPTION OF THE RELATED ART

Glass lighting panels with integrated light sources such as light emitting diodes (LEDs), are known, e.g. for displaying information, for decoration or for lighting purposes. For these application areas, the manufacturing of a glass panel with electronic components typically comprises the steps of depositing a conductive layer on a first glass substrate, realization of electronic circuits in the conductive layer and depositing of electronic components on the conductive layer, connected to the electronic circuits. In the case of a laminated glass panel, a plastics interlayer is then deposited on the conductive layer and a sandwich is obtained by the application of a second glass substrate on the plastics interlayer, which is then laminated as outlined before. In the case of an insulating glass panel, a second glass substrate is maintained, thanks to a spacer profile deposited at the periphery of the first glass substrate, at a distance from the first glass substrate so as to form an intermediate space between the first and second glass substrates.

In each of these applications it is necessary to furnish an electric supply to the conducting layer for supplying electrical power to the LEDs. EP 1 840 449 describes such a panels of glass embedding LEDs. The LEDs are arranged in a regular grid at 5 cm intervals such that the array of diodes covers substantially the entire area of glazing panel. Each LED has a surface area of about 4 $mm^2$. First and second bus bars extend substantially along the entire length of one edge of the panel between the two glass sheets.

It is also known to use light sources such as light emitting diodes (LEDs) that are arranged to emit light into laminated glass panels along a plane of the panel such as described in WO2010097110A1. In that document, the LEDs are arranged to emit light into the plastic interlayer that is at least partially light diffusive to cause the light to be deflected that cause the glass panel to be illuminated.

It is also known to use LEDs that are arranged to emit light into multiple glazings panels along a plane of the panel such as described in US20080184636A1.

Lighting panels comprising at least one organic glass layer with LEDs that are arranged to emit light into the organic glass layer such as Plexiglas EndLighten sold by EVONIK Industries are also known. In such panel, the organic glass layer is made of Poly(methyl methacrylate) embedding colorless diffuser particles which cause the light to diffuse forwards.

Nevertheless a problem with the use of organic glass layers is that their surfaces are highly sensitive to defaults such as scratches and/or stripes. Then, due to the difference of refractive index between the organic glass layer and air (that fills the defaults), every default (scratch and/or stripe and/or protrusion) on the surface of the organic glass layer creates local refraction of the light beam propagating in the panel that deteriorates the uniformity of light generated on the surface of such panel and then also the overall aesthetics of the illuminated panel.

SUMMARY OF THE INVENTION

An object of the invention is to provide glass lighting panels, spacer profile for such glass lighting panel and methods of manufacturing the same.

According to a first aspect, the invention provides:
a glass lighting panel, comprising:
a first glass substrate,
a second glass substrate,
a spacer profile at the periphery of the glass panel between the first and the second glass substrate, the spacer being used to maintain an intermediate space between the first and second glass substrates, According to an aspect of the invention, the panel comprises:
an intermediate organic glass substrate,
at least one light source, According to an aspect of the invention, the spacer profile comprises:
means to maintain the intermediate organic glass substrate in the intermediate space between the first and the second glass substrates,
means to lodge the at least one light source so as the at least one light source emits light into the intermediate organic glass substrate predominantly along a plane of the panel.

According to an aspect of the invention, at least part of the intermediate organic glass substrate is arranged to deflect the light out of the plane of the panel and through at least one of the first and second glass substrates to provide a diffused light output.

According to an aspect of the invention, said means to maintain the intermediate organic glass substrate in the intermediate space comprise:
first and second spring lips extending along at least a portion of the length of the intermediate organic glass substrate, said first and second spring lips being arranged to pinch both main surfaces of an edge of the intermediate organic glass substrate;
a stop that maintains said edge of the intermediate organic glass substrate at a determined distance from the light source in the direction along said plane of the panel.

Spring lips according to the invention can be made of any elastic material such as metal (for instance steel, copper, aluminium . . . ) or plastics or rubber, . . . . Each spring lip can be made thanks to a foil of elastic material, the thickness of which can range from 0.3 to 3 mm, said foil being partly rolled-up to form a lip (for instance as illustrated on FIG. 1).

By having the light deflected by the organic glass substrate, it can be spread or diffused more widely to reduce problems caused by more direct illumination from point sources.

By having the intermediate organic glass substrate arranged between a first and a second glass substrates, the organic glass substrate is then protected against any risk of the occurrence of defaults such as scratches and/or stripes on its surface. And then local refraction of the light beam propagating through defaults in the panel are avoided. Then, the uniformity of the light generated at the surface of panel and the overall aesthetics of the illuminated panel are improved or are kept.

In the following, the expression default encompasses all kind of surface default such as scratches, stripes, protrusion, roughness, striates, projections, slits, puncture, groove, depression, . . . . The defaults can be microscopic. The defaults can be macroscopic.

Embodiments of the invention can have any other features added, some such additional features are set out in dependent claims and described in more detail below.

According to another aspect of the invention, the spacer profile also comprises means to dissipate heat generated by the at least one light source.

According to another aspect of the invention, the means to dissipate heat comprise a radiator embedded in the spacer.

Then, by having means to dissipate heat embedded in the spacer, the invention allows for a better dissipation of heat generated by the light source(s) and then allows to embed in the panel higher densities of light sources and/or higher power light source(s). As a matter of fact, for a good and efficient functioning of most of the light sources (such as LEDs for instance), temperature in the environment around the light sources shall be controlled to be inferior to a temperature threshold (above which the light source intensity or efficiency starts to decrease). Most of the light sources generate heat when functioning due to their electric powering. The higher the electrical power supplied to the light source, the more heat is generated. Moreover, the higher the density of light sources in an environment, the more heat is generated in that environment. A solution to limit/avoid the temperature increase due to electrical powering of the light sources is to dissipate generated heat.

According to another aspect of the invention, the means to lodge the light source comprises a first cavity comprising an opening in front of said edge of the intermediate organic glass substrate so as the light source can emit light through said edge into the intermediate organic glass substrate predominantly along a plane of the panel.

According to another aspect of the invention, the at least one light source is mounted on an elongated support that is inserted into the means to lodge the light source.

According to another aspect of the invention, the spacer profile also comprises a second cavity that comprises means to power and/or control each or all the light source.

According to another aspect of the invention, the intermediate organic glass substrate is at least partially light diffusive to cause the light to be deflected.

According to another aspect of the invention, the intermediate organic glass substrate is a Poly(methyl methacrylate) layer.

According to another aspect of the invention, the intermediate organic glass substrate is a Poly(methyl methacrylate) layer embedding colorless diffuser particles which cause the light to diffuse forwards.

Another aspect provides a spacer profile for maintaining an intermediate space between a first glass substrate and a second glass substrate of a glass lighting panel, the spacer profile being positioned at the periphery of the glass panel between the first and the second glass substrate, the spacer profile comprising:

means to maintain an intermediate substrate in the intermediate space between the first and the second glass substrates and means to lodge at least one light source so as the at least one light source is arranged to emit light into the intermediate substrate predominantly along a plane of the panel.

According to another aspect of the invention, said means to maintain the intermediate organic glass substrate in the intermediate space comprise:

first and second spring lips extending along at least a portion of the length of the intermediate substrate, said first and second spring lips being arranged to pinch both main surfaces of an edge of the intermediate substrate;

a stop that maintains said edge of the intermediate substrate at a determined distance from the light source in the direction along said plane of the panel.

According to another aspect of the invention, the spacer profile also comprises means to dissipate heat.

According to another aspect of the invention, the means to dissipate heat comprise a radiator embedded in the spacer.

According to another aspect of the invention, the means to lodge the light source comprises a first cavity comprising an opening in front of said edge of the intermediate substrate so as the light source can emit light through said edge into the intermediate substrate predominantly along a plane of the panel.

According to another aspect of the invention, the light source is mounted on an elongated support that is inserted into the means to lodge the light source.

According to another aspect of the invention, the spacer profile also comprises a second cavity that comprises means to power and/or control each or all the light source.

Another aspect provides a method of manufacturing a glass lighting panel comprising a first glass substrate and a second glass substrate, comprising the following step:

providing a spacer profile at the periphery of the glass panel between the first and the second glass substrate to maintain an intermediate space between the first and second glass substrates, According to an aspect of the invention, the method also comprises the following steps:

maintaining, thanks to:

first and second spring lips of the spacer profile extending along at least a portion of the length of the intermediate organic glass substrate and a stop of the spacer profile that maintains said edge of the intermediate organic glass substrate at a determined distance from the light source in the direction along said plane of the panel an intermediate organic glass substrate in the intermediate space between the first and the second glass substrates, said first and second spring lips being arranged to pinch both main surfaces of an edge of the intermediate organic glass substrate;

lodging, thanks to the spacer profile, at least one light source so as the at least one light source emits light into the intermediate organic glass substrate predominantly along a plane of the panel, arranging at least part of the intermediate organic glass substrate to deflect the light out of the plane of the panel and through at least one of the first and second glass substrates to provide a diffused light output.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DESCRIPTION OF THE PREFERRED EMBODIMENTS

Figure 2:
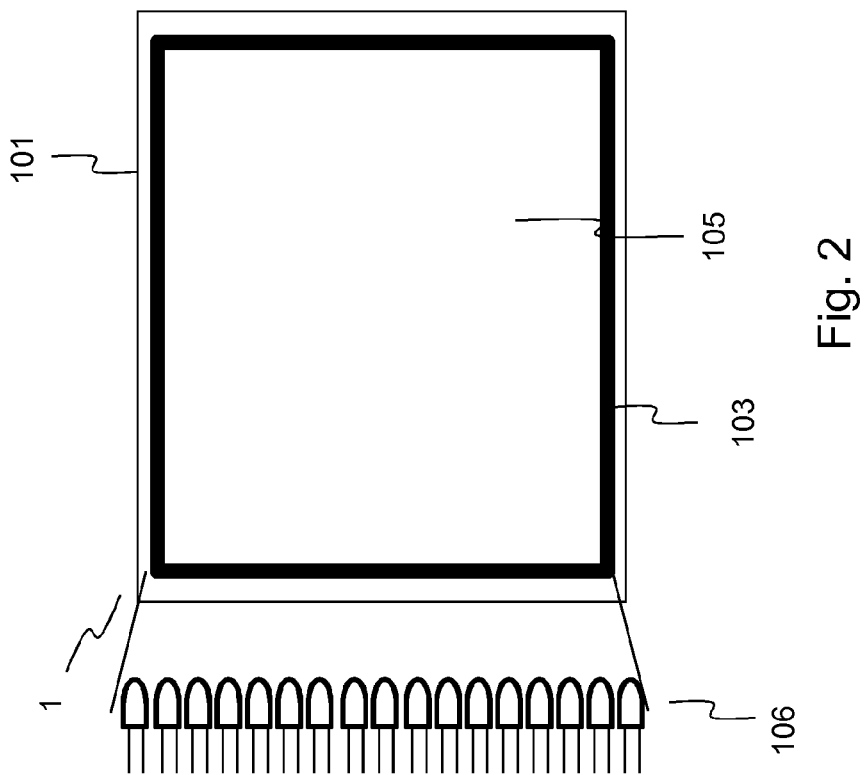
FIG. 2 shows a top view of FIG. 1 embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

Introduction to Some Embodiments

Some of the features described below arise from an appreciation that the surfaces of an organic glass substrate are highly sensitive to defaults such as scratches and/or stripes and/or protrusions and then, if default are present on the surface of such a substrate, light generated on the surface of such a substrate is not perfectly uniform and the overall aesthetics of the panel is decreased.

Thus an objective of at least some of the embodiments is to provide a panel of glass including at least one light source which provides surface lighting with an improved uniformity. Another objective of some embodiments is to provide such a surface lighting panel in which the aesthetics of the panel is improved. Another objective of at least some embodiments is to provide such a surface lighting panel which allows to embed in the panel higher densities of light sources and/or higher power light source(s).

Some embodiments involve a glass lighting panel, comprising a first glass substrate an intermediate organic glass substrate, a second glass substrate and a spacer profile at the periphery of the glass panel between the first and the second glass substrates, the spacer being used to maintain an intermediate space between the first and the second glass substrate. The glass substrates can encompass glass equivalents such as hard plastic or Perspex acrylic or polycarbonate materials. The panel can have at least one light source lodged in the spacer profile so as to emit light into the intermediate organic glass substrate predominantly along a plane of the panel.

The organic glass layer can be arranged to be at least partially light diffusive such that light emitted by the at least one light source is deflected out of the plane of the panel and through the surfaces of at least one of the glass substrates. This can be made partially diffusive by choice of properties of the material, by adding particles (e.g. colorless or colored diffuser particles), by adding any kind of reflective or partially reflective structures, or by surface treatments to hinder total internal reflection and so on. The panel according to the invention can be flat and be for instance a building window or door, a partition wall for indoor or outdoor architectural applications, a display panel (e.g. for advertising), a road sign, . . . .

Nevertheless, the panel need not be flat, it can be formed to have a curved main surface for instance, the panel can be a vehicle glazing.

Additional Features:

Some additional features of some of the embodiments are as follows.

In some cases at least one light source such as an LED, OLED etc. can be embedded in the spacer profile (in lodging means of the spacer profile) at the periphery of the glass panel in order to emit light into the intermediate organic glass substrate (preferentially at the edge of the intermediate organic glass substrate) in a direction predominantly included in the plane of the panel.

According to a first aspect of the invention, only one light source can be lodged in the spacer profile in order to emit light into the intermediate organic glass substrate. It can be lodged everywhere in the spacer profile and emit light in every portion of the edges of the intermediate organic glass substrate.

Clearly according to other aspects of the invention, two, three, four, or any other quantity of light sources can be lodged everywhere in the spacer profile so as to emit light into the intermediate organic glass substrate. In case of a perpendicular panel comprising a perpendicular intermediate organic glass substrate comprising four edges, the light sources can be lodged in the spacer profile so as to emit in any portion of any edge of the intermediate organic glass substrate. The light sources can also be lodged in the spacer on a regular basis so as to emit light on a regular basis in the four edges of the intermediate organic glass substrate.

Any kind of light source that can be embedded in the spacer profile can be implemented in the present invention such as LED, OLED, laser diodes, fluorescent tube, fluorescent lamp, . . . .

Figure 1:
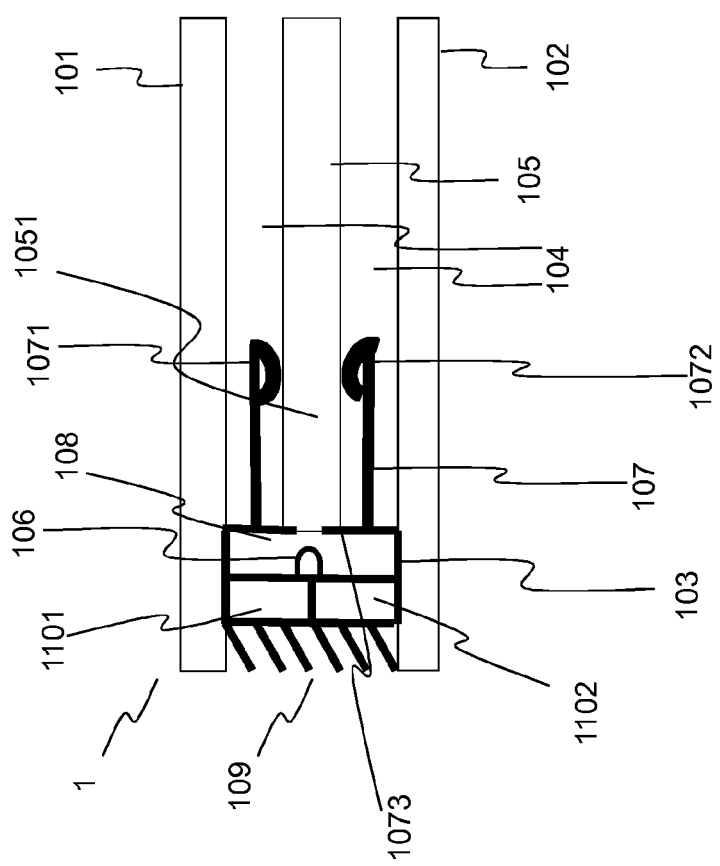
FIG. 1 shows a cross section view a portion of a panel according to a particular embodiment according to which the light sources are LEDs that are arranged at the periphery of the glass panel in order to emit light in a direction along the plane of the glass substrates.

FIGS. 1 and 2

A First Embodiment

FIG. 1 shows a portion of a cross section view and FIG. 2 shows a top view of a glass lighting panel 1 according to a particular embodiment of the invention.

The glass lighting panel 1 comprises a first glass plate or substrate 101, an intermediate organic glass substrate 105 (such as Endlighten T sold by Evonik in L, XL, XXL model), a second glass plate or substrate 102, a plurality of LEDs 106 and a spacer profile 103 at the periphery of the glass panel 1 between the first 101 and the second 102 glass substrates, the spacer 103 being used to maintain an intermediate space 104 (or cavity) between the first and the second glass substrates.

Preferentially, the spacer profile 103 comprises:
means 107 to maintain the intermediate organic glass substrate 105 in the intermediate space 104, and
means 108 to lodge the LEDs 106 so that they emit light into the intermediate organic glass substrate 105 predominantly along a plane of the panel.

Preferentially, the means 107 to maintain the intermediate organic glass substrate 105 in the intermediate space 104 comprises:
a first spring lip 1071 and a second spring lip 1072, both spring lips extending along at least a portion of the length of the intermediate organic glass substrate 105, the first and second spring lips being arranged to pinch both main surfaces of an edge 1051 of the intermediate organic glass substrate 105;
a stop 1073 that maintain the intermediate organic glass substrate 105 at a determined distance (depending of the LEDs 106, for instance the distance can range from 0.5 mm to 30 mm) from the LEDs 106 in the direction along said plane of the panel.

Spring lips according to the invention can be made of any elastic material such as metal (for instance steel, copper, aluminium, . . . ) or plastics or rubber, . . . . Each spring lip can be made thanks to a foil of elastic material, the thickness of which can range from 0.3 to 3 mm, said foil being partly rolled-up to form a lip (for instance as illustrated on FIG. 1). The first 1071 and second 1072 springs lips and the stop 1073 can be initially realized as parts of the spacer 103 and then made thanks to the material of the spacer 103, or can be initially provided independent of the spacer 103 and attached (e.g. by soldering, gluing, . . . ) in a second time to the spacer 103. According to this last alternative, the material of the spring lips and of the stop can be different from the material of the rest of the spacer 103.

Preferentially, the means 108 to lodge the LEDs 106 comprises a first cavity comprising an opening in front of said edge 1051 of the intermediate organic glass substrate 105 so as the LEDs can emit light through said edge 1051 into the intermediate organic glass substrate 105 predominantly along a plane of the panel.

Preferentially, in a preliminary step, the LEDs 106 are mounted on an elongated support that is, in a subsequent step, inserted into the means 108 to lodge the LEDs 106.

The spacer profile 103 can be made from any suitable material such as alumina, stainless steel, plastic, and many other materials.

Preferentially, the spacer profile 103 also comprises means 109 to dissipate heat generated by the LEDs 106. Preferentially, the means to dissipate heat comprise a radiator 109 embedded in the spacer. Preliminary test have shown that the ambient temperature of the LEDs can be up to 60° C., which greatly reduces their lifetime. Therefore, the heat dissipating means are very important particularly when high light output is required.

Preferentially, the spacer profile is made from a heat conducting material such as a metal (e.g. alumina, stainless steel, . . . or combination thereof) or and the radiator 109 is made by realizing wings on the edge of the spacer profile 103 that is in contact with the external atmosphere (external edge of the spacer).

On FIG. 1, the spacer is represented has having a hollow rectangular section, obviously, for better heat dissipation performances, the spacer can have a bulk rectangular section.

According to the present particular embodiment, the glass lighting panel 1 is an rectangular insulating multiple glazing panel embedding a rectangular intermediate organic glass substrate. The intermediate space or cavity 104 can be filled with a gas such as air or any insulating gas, e.g. Argon, Krypton, Xenon, SF6, CO2, . . . or any combination of the previously mentioned gas. A sealant, e.g. a butyl coating, can be provided between the spacer and the internal surface (surface of the substrate that is in contact with the intermediate space 104) of the first and second glass substrate to seal the panel and avoid the gas to leave the cavity 104. Alternatively, a vacuum can be created in the intermediate space or cavity 104. Preferentially, the spacer profile 103 is filled with or contain desiccant to remove moisture trapped in the gas space during manufacturing of the panel 1.

According to the present particular embodiment, the spacer profile each LED 106 is lodged in a housing 108 of the spacer profile on a regular basis so as to emit light on a regular basis in the four edges of the intermediate organic glass substrate 105.

FIG. 2 illustrates on strip of LEDs 106 (the LEDs 106 being arranged on their support) down one edge of the rectangular laminated glass panel 1, but, according to the present particular embodiment, the three other edges of the panel are also provided with LEDs 106.

Preferentially, the spacer profile also comprises a second cavity 1101 that comprises means (non-illustrated on the figures) to power and/or control each or all the LEDs 106 (for instance cables).

Preferentially, the spacer profile also comprises a third cavity 1102 in which a desiccant (non-illustrated on the figures) is inserted. Said third cavity 1102 is designed so as the desiccant is in contact with the fluid (air, gas, . . . ) in the intermediate space 104.

Preferentially, a black anodized aluminium U shaped profile (non-illustrated on the figures) is fitted around the spacer profile 103 to cover the profile 103 and the spring lips 1071 and 1072.

At least part of the intermediate organic glass substrate 105 is arranged to deflect the light out of the plane of the panel and through at least one of the first and second glass substrates to provide a diffused light output. Preferentially, it is at least partially light diffusive to cause the light to be deflected.

For instance, the organic glass substrate is a Poly(methyl methacrylate) layer and more particularly a Poly(methyl methacrylate) (hereafter referenced PMMA) layer embedding colorless diffuser particles which cause the light to diffuse forwards. For instance, the organic glass layer is a layer of Plexiglas Endlighten T, Grade number 0N001, 8 mm thickness that is sold by the company EVONIK Industries. The refractive index of this PMMA is 1.491 measured using ISO 489. According to another embodiment, the organic glass layer embeds particles only on a part of its volume, for instance only in a central part of that substrate. Different particle concentrations can be used and can be adapted to the dimensions of the glass panel 1.

The glass of the first and second glass substrates can be coated, tinted, tempered or bended or a combination of these. In this example 50 cm*30 cm sheets with a thickness of 2.1 mm can be considered, though other dimensions can be used according to the application. The LEDs 106 can be for example LEDs strips sold by OSRAM with the reference LF06P-W4F-854 or VISTAR VFS-N3528-120W-L1.

Then, thanks to the presence of the diffuser particles in the intermediate organic glass substrate 105, the organic glass substrate 105 cause the light emitted by the light sources (LEDs 106) to diffuse forward and then deflects the light emitted by the LEDs 106 out of the plane of the panel 1 and through the first and second glass substrates to provide a diffused light output.

Basic methods for assembling/manufacturing glass, without the novel features of the present invention, for use in this and other embodiments are well-known in the window/double glazing industry.

Figure 3:
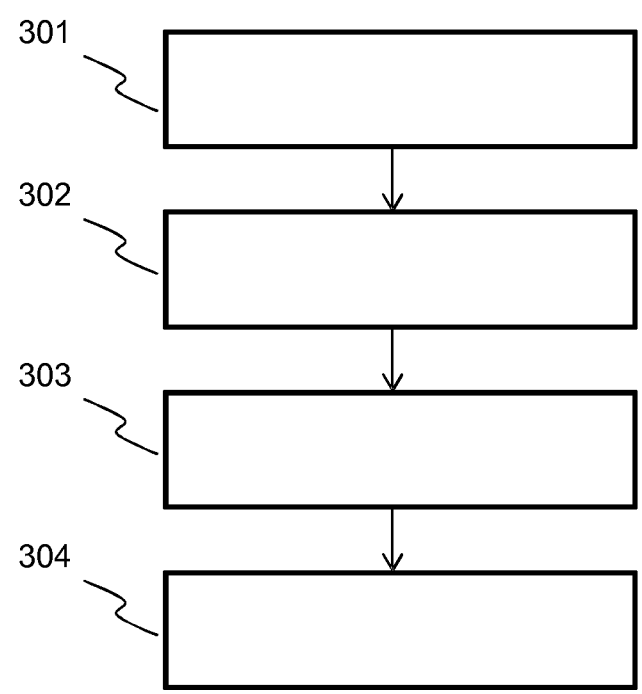
FIG. 3 shows process diagram of another embodiment and method of making a glass lighting panel.

According to a present particular embodiment, a method of manufacturing of the glass lighting panel 1 comprising the first glass substrate 101 and the second glass substrate 102, is illustrated on FIG. 3 and comprises the following step:

providing 301 the spacer profile 103 at the periphery of the glass panel between the first and the second glass substrate to maintain the intermediate space 104 between the first and second glass substrates, maintaining 302, thanks to:

first 1071 and second 1072 spring lips of the spacer profile 103 extending along at least a portion of the length of the intermediate organic glass substrate 105 and a stop of the spacer profile 103 that maintains said edge 1051 of the intermediate organic glass substrate 105 at a determined distance from the light source 106 in the direction along said plane of the panel an intermediate organic glass substrate 105 in the intermediate space between the first and the second glass substrates, said first and second spring lips being arranged to pinch both main surfaces of an edge 1051 of the intermediate organic glass substrate 105;

lodging 303, thanks to the spacer profile, the LEDs 106 so as they emit light into the intermediate organic glass substrate predominantly along a plane of the panel, arranging 304 at least part of the intermediate organic glass substrate 105 to deflect the light out of the plane of the panel and through at least one of the first and second glass substrates to provide a diffused light output.

Other Embodiments

In some cases one or both the first and second glass substrates can be flat soda lime glass, notably float glass. One or both of the first and second glass substrates may be clear glass, extra clear glass or body tinted glass. Particularly when intended for use in window applications, the glazing panel may be substantially transparent. In this case, it may have a light transmission (CIE Illuminant C) of greater than or equal to 40%, 50%, 60% or 70% and/or a level of haze of less than or equally to 5%, 3% or 2% for example. Particularly when intended for decoration and/or lighting purposes, it may be unnecessary and/or undesired for the panel to be substantially transparent. In this case, it may have a light transmission (CIE Illuminant C) of less than or equal to 20%, 10%, or 5% and/or a level of haze of greater than or equally to 30%, 40% or 50%.

Examples of additives to make the organic glass layer diffusive can encompass inorganic particles of glass, silica, mica, synthetic mica, calcium carbonate, barium sulfate, talc, montmorillonite, kaolin clay, bentonite, hectorite, etc., metal oxide particles of titanium oxide, zinc oxide, tin oxide, alumina, etc., or organic polymer particles of acrylic beads, styrene beads, benzoguanamine, silicone, etc. A haze value when the diffusing material is added is preferably not lower than 10% but not greater than 99%. If it is lower than 10%, a sufficient light scattering effect may not be obtained, and if it is greater than 99%, the light transmission characteristics degrade, greatly reducing the amount of emergent light.

More diffusion can be obtained by surface roughening of a light-emitting face accomplished by cutting using a saw or an automatic cutter (for example, an NC router) or by blasting, surface grinding using a grinder, emboss forming, etc. In the case of blasting, particles are applied using a high-speed blasting machine over the surface of the organic glass layer, the interlayers or the glass substrates to form random projections and depressions, and the thus formed surface can be used as the light-emitting face. In the case of grinding, a grinder using, for example, a file is used to grind the surface.

The light sources can be coloured, and optionally arranged so that there is colour mixing to achieve a uniform white. The relative levels of the colours can be controlled to control the colour temperature if desired. The panels can be incorporated into buildings, windows, mirrors, backlights for display systems and so on. Arrays of the panels can be built up to illuminate larger areas.

Other variations can be envisaged within the scope of the claims.

The invention claimed is:

1. A glass lighting panel, comprising:
a first glass substrate,
a second glass substrate,
a spacer profile at the periphery of the glass lighting panel between the first glass substrate and the second glass substrate so as to maintain an intermediate space between the first and second glass substrates,
an intermediate organic glass substrate, and
a light source,
wherein
the spacer profile comprises:
a maintainer maintaining the intermediate organic glass substrate in the intermediate space between the first and the second glass substrates, and
a lodger lodging the light source so that the light source emits light into the intermediate organic glass substrate predominantly along a plane of the panel,
at least part of the intermediate organic glass substrate is arranged to deflect light out of the plane of the panel and through at least one of the first and second glass substrates to provide a diffused light output; and
the maintainer comprises:
a first and a second spring lips extending along at least a portion of the length of the intermediate organic glass substrate, and arranged to pinch both main surfaces of an edge of the intermediate organic glass substrate; and
a stop that maintains the edge of the intermediate organic glass substrate at a determined distance from the light source in a direction along the plane of the panel.

2. The lighting panel of claim 1, wherein the spacer profile also comprises a dissipater dissipating heat generated by the light source.

3. The lighting panel of claim 2, wherein the dissipater comprises a radiator embedded in the spacer profile.

4. The lighting panel of claim 1, wherein the lodger comprises a first cavity comprising an opening in front of the edge of the intermediate organic glass substrate so that the light source emits light through the edge into the intermediate organic glass substrate predominantly along a plane of the panel.

5. The lighting panel of claim 1, wherein the light source is mounted on an elongated support that is inserted into the lodger.

6. The lighting panel of claim 1, wherein the spacer profile also comprises a second cavity that comprises mower and/or a controller to power and/or control the light source.

7. The lighting panel of claim 1, wherein the intermediate organic glass substrate is at least partially light diffusive to cause the light to be deflected.

8. The lighting panel of claim 7, wherein the intermediate organic glass substrate is a poly(methyl methacrylate) layer embedding colorless diffuser particles which cause the light to diffuse forwards.

9. The lighting panel of claim 1, wherein the intermediate organic glass substrate is a poly(methyl methacrylate) layer.

10. The spacer profile of claim 1, further comprising: a second cavity that comprises a power and/or a controller to power and/or control each or all the light source.

11. A spacer profile comprising:
a maintainer maintaining an intermediate substrate in an intermediate space between a first and a second glass substrate of a glass lighting panel, and
a lodger lodging at least one light source so that the at least one light source is arranged to emit light into the intermediate substrate predominantly along a plane of the panel;
wherein:
the spacer profile is positioned at the periphery of the panel between the first and the second glass substrates, and
the maintainer comprises:
a first and a second spring lips extending along at least a portion of the length of the intermediate substrate and arranged to pinch both main surfaces of an edge of the intermediate substrate; and
a stop that maintains the edge of the intermediate substrate at a determined distance from the light source in the direction along the plane of the panel.

12. The spacer profile of claim 11, further comprising: a dissipater to dissipate heat.

13. The spacer profile of claim 12, wherein the dissipater comprise a radiator embedded in the spacer profile.

14. The spacer profile of claim 11, wherein the light source is mounted on an elongated support that is inserted into the lodger.

15. The spacer profile of claim 11, wherein the lodger comprises a first cavity comprising an opening in front of the edge of the intermediate substrate so that the light source emits light through the edge into the intermediate substrate predominantly along a plane of the panel.

16. A method of manufacturing a glass lighting panel, the method comprising:
positioning a spacer profile at the periphery of the glass panel between a first and a second glass substrate of the panel to maintain an intermediate space between the first and second glass substrates,
maintaining
an intermediate organic glass substrate in the intermediate space between the first and the second glass substrates via a first and a second spring lips of the spacer profile extending along at least a portion of the length of the intermediate organic glass substrate and a stop of the spacer profile maintaining an edge of the intermediate organic glass substrate at a determined distance from at least one light source in the direction along a plane of the panel, wherein the first and second spring lips are arranged to pinch both main surfaces of the edge of the intermediate organic glass substrate;
lodging the at least one light source via the spacer profile so that the at least one light source emits light into the intermediate organic glass substrate predominantly along the plane of the panel, and
arranging at least part of the intermediate organic glass substrate to deflect the light out of the plane of the panel and through at least one of the first and second glass substrates to provide a diffused light output.

* * * * *